(12) United States Patent
Lee

(10) Patent No.: US 7,742,861 B2
(45) Date of Patent: Jun. 22, 2010

(54) SYSTEM OF WIRELESS ELECTRONIC DEVICES FOR CONSTRUCTION EQUIPMENT AND MAINTENANCE SYSTEM THEREOF

(75) Inventor: Chang Soo Lee, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 881 days.

(21) Appl. No.: 11/510,777

(22) Filed: Aug. 25, 2006

(65) Prior Publication Data

US 2007/0073457 A1  Mar. 29, 2007

(30) Foreign Application Priority Data

Sep. 26, 2005  (KR) ...................... 10-2005-0089321

(51) Int. Cl.
  *G06F 19/00* (2006.01)
(52) U.S. Cl. ............................... 701/50; 701/1; 701/36; 701/200; 340/426.13; 340/426.19; 340/438; 340/539.1; 455/550.1; 455/554.2; 455/556.1; 455/555; 455/561; 709/213
(58) Field of Classification Search .................. 701/50, 701/1, 200
  See application file for complete search history.

(56) References Cited

U.S. PATENT DOCUMENTS

| | | | | |
|---|---|---|---|---|
| 5,968,104 | A * | 10/1999 | Egawa et al. ................... | 701/50 |
| 6,161,071 | A * | 12/2000 | Shuman et al. ................ | 701/48 |
| 6,513,554 | B1 | 2/2003 | Hellstrom et al. | |
| 6,542,077 | B2 * | 4/2003 | Joao ....................... | 340/426.16 |
| 6,745,047 | B1 * | 6/2004 | Karstens et al. .......... | 455/556.1 |
| 6,990,398 | B2 * | 1/2006 | Kinugawa ..................... | 701/50 |
| 7,277,010 | B2 * | 10/2007 | Joao ....................... | 340/539.25 |

(Continued)

FOREIGN PATENT DOCUMENTS

CN  1343328 A  4/2002

(Continued)

OTHER PUBLICATIONS

Guocheng Jun, et al., "Design of a Wireless Remote Switch Control System", *Basic Automation* , Feb. 2002, vol. 9, Issue 1, pp. 52-54.

*Primary Examiner*—Khoi Tran
*Assistant Examiner*—Jonathan Sample
(74) *Attorney, Agent, or Firm*—Ladas and Parry LLP

(57) ABSTRACT

A system of wireless electronic devices for construction equipment and a maintenance system thereof are disclosed, in which various information used in an input and output unit, like modules of a construction work vehicle such as a hydraulic excavator, etc., are transmitted and received based on a wireless method, so that the use of wires can be significantly decreased. The wireless electronic system of a construction machine comprises at least one control panel which transmits a wireless signal for controlling each part of a construction machine in accordance with an operator's control; a main control device which receives a wireless signal from the control panel and transmits a wireless control signal for controlling a corresponding device; at least one auxiliary control device which performs input and output control, operation control, error detection, automatic control, etc. of each part of a construction machine in accordance with a wireless control signal from the main control device; and an internal wireless network which is constructed by the main control device for wireless data communication between the control panel, the main control device and the auxiliary control device.

15 Claims, 5 Drawing Sheets

U.S. PATENT DOCUMENTS

| | | | |
|---|---|---|---|
| 7,522,979 B2* | 4/2009 | Pillar | 701/33 |
| 2002/0038172 A1* | 3/2002 | Kinugawa | 701/50 |
| 2003/0147727 A1* | 8/2003 | Fujishima et al. | 414/200 |
| 2003/0193404 A1* | 10/2003 | Joao | 340/825.71 |
| 2003/0206102 A1* | 11/2003 | Joao | 340/539.1 |
| 2003/0211866 A1* | 11/2003 | Narazaki et al. | 455/561 |
| 2004/0030919 A1 | 2/2004 | Moriya et al. | |
| 2004/0160319 A1* | 8/2004 | Joao | 340/539.1 |
| 2004/0199831 A1 | 10/2004 | Shibata et al. | |
| 2005/0248444 A1* | 11/2005 | Joao | 340/426.13 |
| 2006/0184295 A1* | 8/2006 | Hawkins et al. | 701/33 |
| 2007/0010922 A1* | 1/2007 | Buckley | 701/29 |
| 2007/0288553 A1* | 12/2007 | Donaghey et al. | 709/203 |

FOREIGN PATENT DOCUMENTS

| | | |
|---|---|---|
| CN | 1552008 A | 12/2004 |
| CN | 1603528 A | 4/2005 |
| CN | 2724629 Y | 9/2005 |
| EP | 1 426 498 A1 | 6/2004 |
| EP | 1 434 117 A1 | 6/2004 |
| JP | 10-46630 A | 2/1998 |
| JP | 2000006738 A | 1/2000 |
| JP | 2002081096 A | 3/2002 |
| JP | 2002332666 A | 11/2002 |
| JP | 2003085267 A | 3/2003 |
| JP | 2003152737 A | 5/2003 |
| JP | 2004316279 A | 11/2004 |
| JP | 2005080550 A | 3/2005 |
| JP | 2005113397 | 4/2005 |
| WO | 0049474 | 8/2000 |
| WO | 03/023153 A1 | 3/2003 |
| WO | 03/023539 A1 | 3/2003 |

* cited by examiner

SYSTEM OF WIRELESS ELECTRONIC DEVICES FOR CONSTRUCTION EQUIPMENT AND MAINTENANCE SYSTEM THEREOF

BACKGROUND OF THE INVENTION

1. Field of the Invention

The present invention relates to an information transfer system of a construction machine, and in particular to a system of wireless electronic devices for construction equipment and a maintenance system thereof in which various information used in an input and output unit like modules of a construction work vehicle such as a hydraulic excavator, etc. are transmitted and received based on a wireless method, so that the use of wires can be significantly decreased.

2. Description of the Background Art

A construction work machine (hereinafter referred to as "construction machine") such as a hydraulic shovel is generally provided with an ECU (Electronic Control Unit) with which work convenience, accurate control and safety are achieved. In addition, various auxiliary devices (air conditioner, heating and cooling device, radio, etc) are further provided for an operator's convenience.

As the technology of the ECU advances, a construction machine is not controlled by only one ECU, but the work devices of a construction machine are classified and controlled by the unit of each module, so that the construction machine is generally controlled using a plurality of ECUs.

FIG. 1 is a view illustrating an operation cab of a construction machine.

As shown in FIG. 1, an operation cab of a construction machine is provided with control panels 100, 102 and 104 each having a plurality of switches and control levers for controlling various electronic devices and work devices installed at a construction machine, and an MDU (Machine Display Unit) for informing an operator of various information concerning a construction machine.

As the uses of electronic control devices and various auxiliary devices provided on a construction machine increase, the number of switches provided in an operation cab of a construction machine also significantly increases. As a result, many electronic wires are installed in the narrow space between the inner and outer decoration parts in a structure of an operation cab in which various electronic devices are assembled, so the inner construction of the operation may be disadvantageously complicated.

FIG. 2 is a block diagram illustrating an electronic system of a conventional construction machine.

As shown in FIG. 2, in an electronic system of a conventional construction machine, a plurality of control panels 100, 102 and 104 and MDU 106 of an operation cab are each connected to a controlled device such as various electronic control devices 200, 202 and 204, a cooling and heating device 210 and a radio 212 through the internal or external electronic wires of the operation cab.

An I-ECU (Information-Electronic Control Unit) 200, an E-ECU (Engine-Electronic Control Unit) and a V-ECU (Vehicle-Electronic Control Unit) 204 are connected to a controlled device (engine 206, and a pump 208), a plurality of work devices 220, and a plurality of sensors 222 through internal full-length wires of a construction machine. Each controlled device is controlled in accordance with a control signal from each control panel 100, 102, 104, so that an operator can perform a desired function.

So, as the uses of electronic control devices and other auxiliary devices provided in a construction machine increase, the electronic wires of the peripheral portions of the operation cab and the interior of the construction machine become increasingly complicated. Many difficulties lie in the application of the wires due to its limited space. Namely, it is difficult to freely select the thickness of each wire, and the assembling of the wires may be difficult.

In addition, since a plurality of electrical and electronic wires are needed, a certain troubleshooting is needed so as to overcome some problems such as a short circuit of wires.

SUMMARY OF THE INVENTION

Accordingly, it is an object of the present invention to provide a system of wireless electronic devices for construction equipment and a maintenance system thereof that overcome the problems encountered in a conventional art.

It is another object of the present invention to provide a system of wireless electronic devices for construction equipment and a maintenance system thereof in which various information used in an input and output unit like modules of a construction work vehicle such as a hydraulic excavator, etc. are transmitted and received based on a wireless method, so that the use of wires can be significantly decreased.

To achieve the above objects, in an electronic system of a construction machine provided with a plurality of controlled control devices and a plurality of sensors for sensing a state of each controlled control device, a wireless electronic system of a construction machine comprises at least one control panel which transmits a wireless signal for controlling each part of a construction machine in accordance with an operator's operation; a main control device which receives a wireless signal from the control panel and transmits a wireless control signal to control a corresponding device; at least one auxiliary control device which performs an input and output control, operation control, error detection, automatic control, etc. of each part of a construction machine in accordance with a wireless control signal from the main control device; and an internal wireless network that is constructed by the main control device for wireless data communication between the control panel, the main control device and the auxiliary control device.

To achieve the above objects, in a construction machine maintenance system in which a construction machine maintenance server is connected with a construction machine through a commercial wireless network, with the construction machine maintenance server being provided with a construction machine information database, a construction machine maintenance information database, and a construction machine part database, there is provided a maintenance system using a wireless electronic system of a construction machine that comprises a construction machine which includes a wireless electronic system of the construction machine of claim 1; and a construction machine maintenance server that receives construction machine state information transferred from the construction machine through the commercial wireless network, constructs a construction machine database by using state information of the construction machine and transmits a maintenance information data to the construction machine for maintaining the construction machine when a construction machine has an error as a result of the analysis that is performed with respect the construction machine with reference to the construction machine maintenance information database.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A system of wireless electronic devices for construction equipment and a maintenance system thereof according to the preferred embodiments of the present invention will be described.

A preferred embodiment of the present invention will be described with reference to FIGS. 3 and 4.

Figure 1:
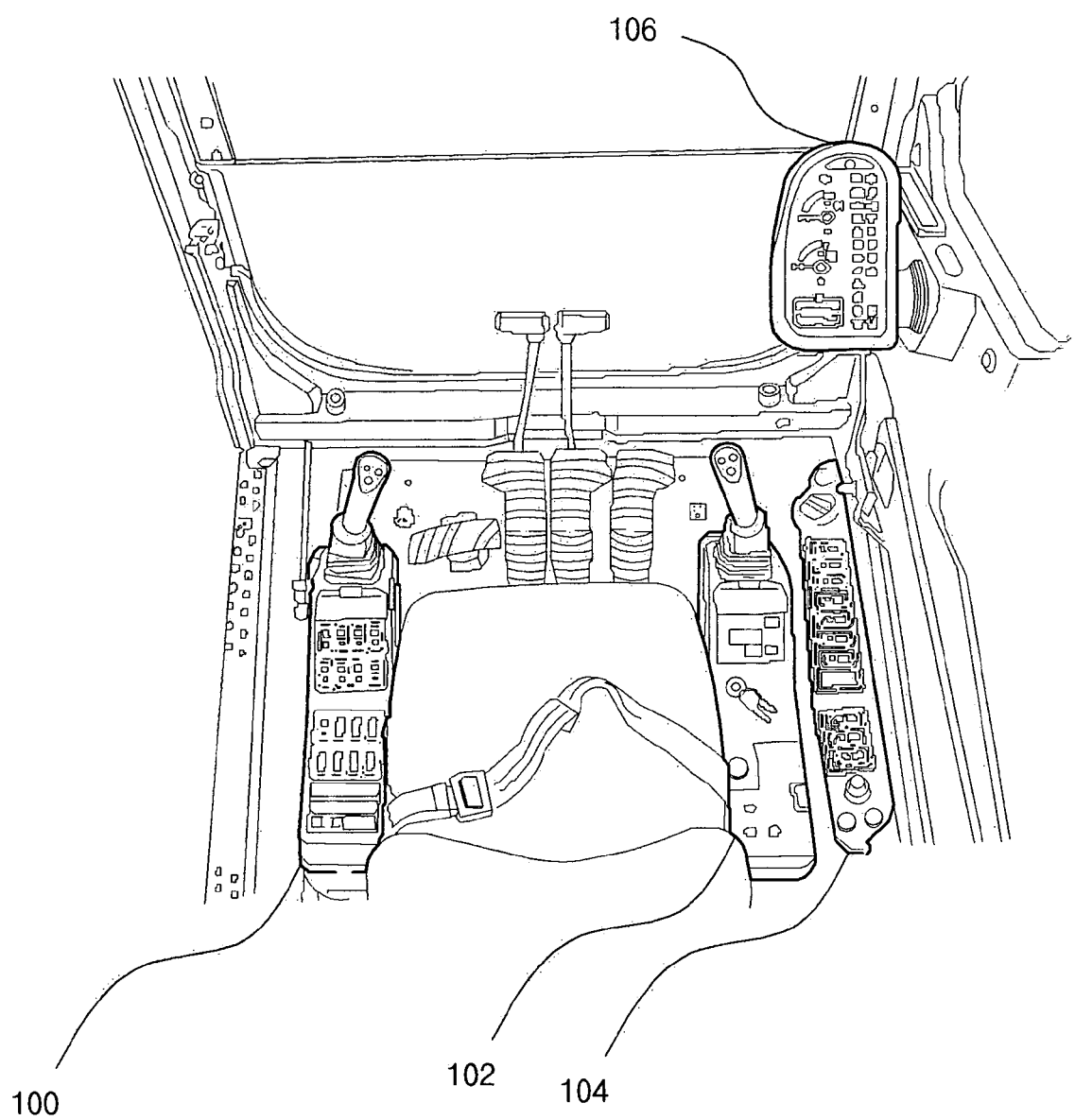
FIG. 1 is an example view illustrating a cab of a construction machine.
Figure 2:
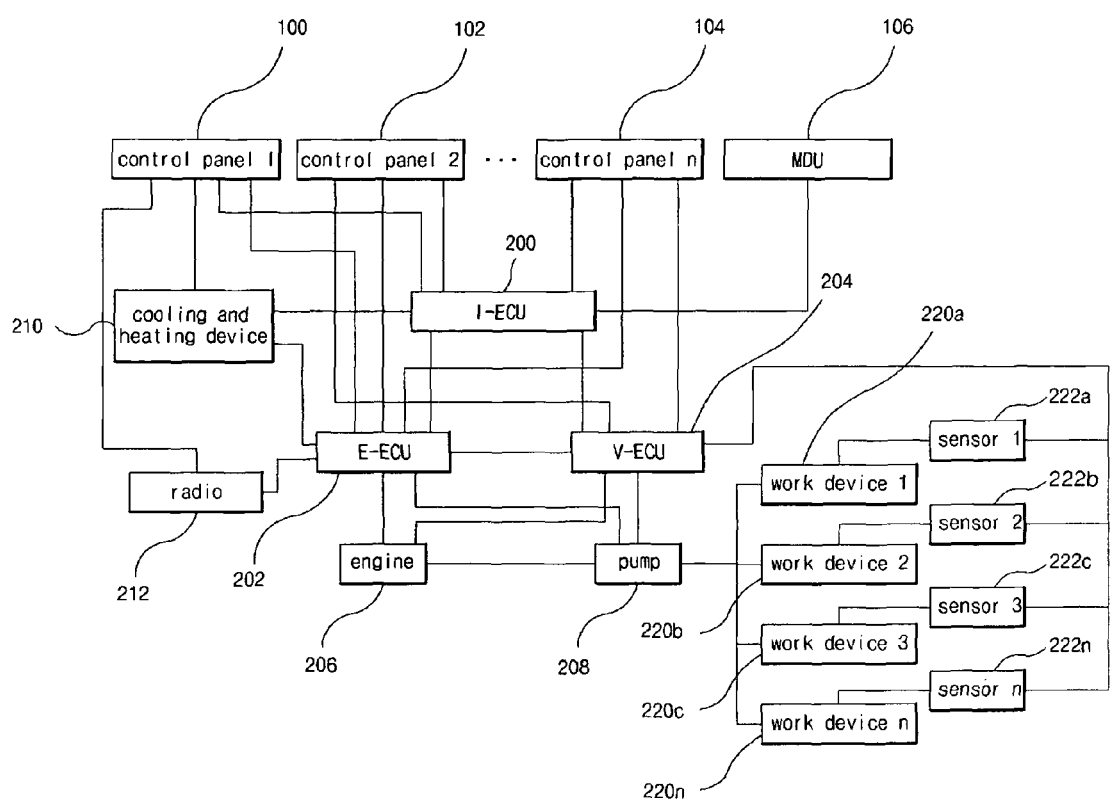
FIG. 2 is a block diagram illustrating an electronic system of a conventional construction machine.
Figure 3:
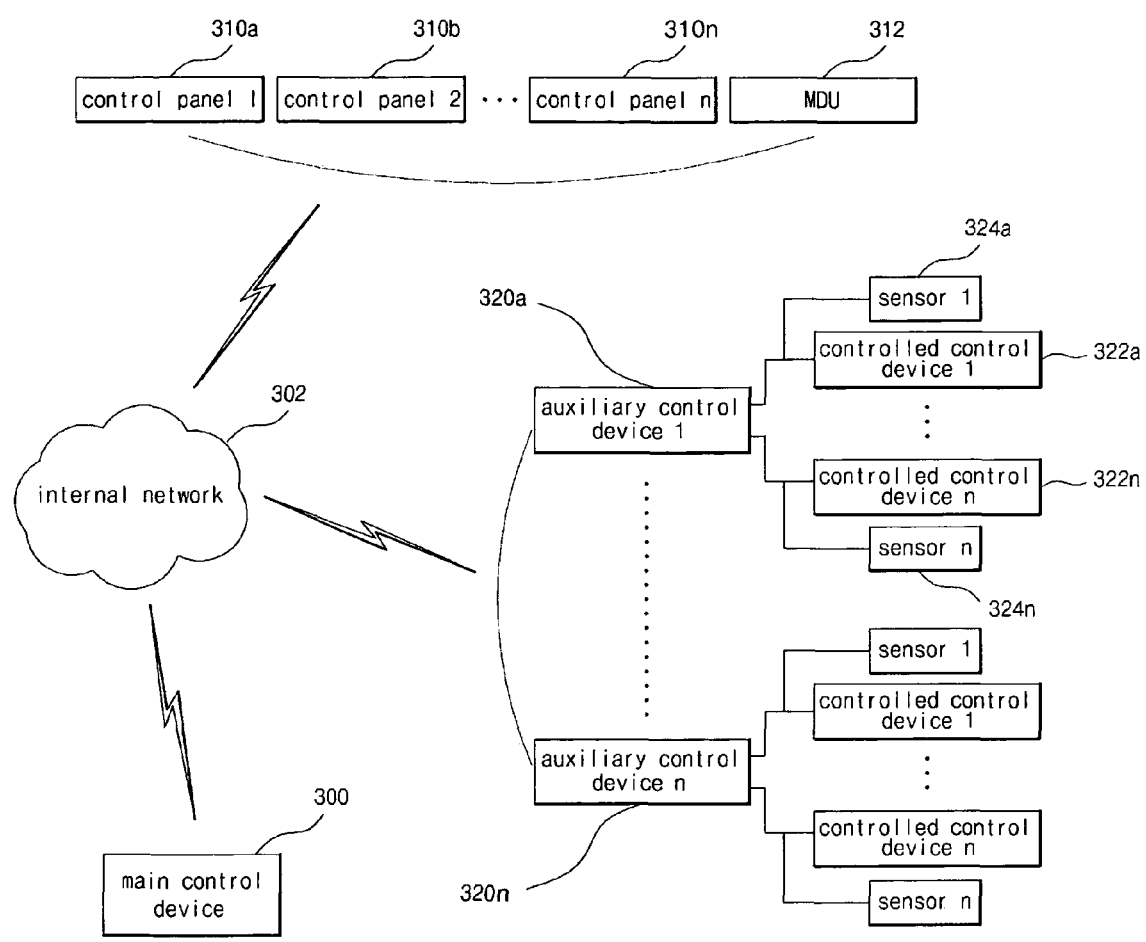
FIG. 3 is a schematic view illustrating a construction of a wireless electronic system of a construction machine according to an embodiment of the present invention.
Figure 4:
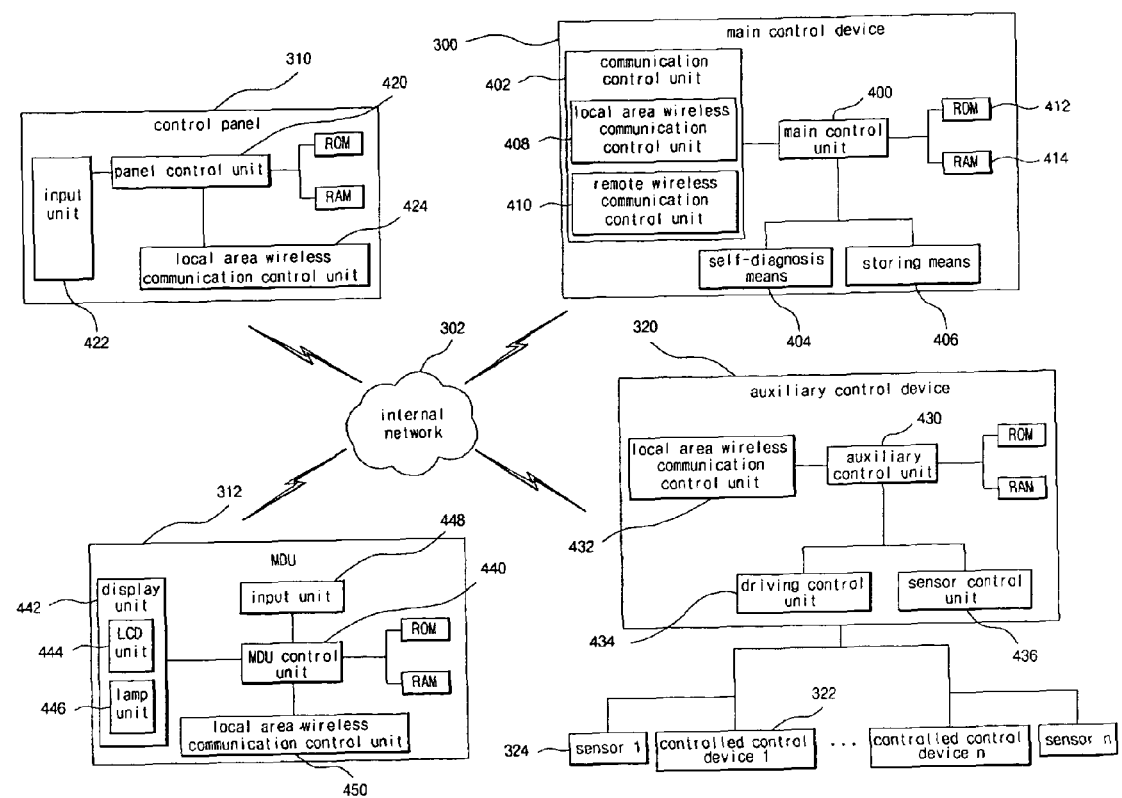
FIG. 4 is a block diagram illustrating a wireless electronic system of a construction machine according to an embodiment of the present invention.

FIG. 3 is a schematic view illustrating a construction of a wireless electronic system of a construction machine according to an embodiment of the present invention, and FIG. 4 is a block diagram illustrating a wireless electronic system of a construction machine according to an embodiment of the present invention.

As shown in FIG. 3, a wireless electronic system of a construction machine according to the present invention comprises a main control device 300, an internal wireless network 302, a plurality of control panels 310, an MDU 312, and a plurality of auxiliary control devices 320.

A wireless electronic system of a construction machine according to the present invention comprises at least one control panel 310.

The control panel 310 receives a certain operation, which an operator wants, through an input unit which includes a plurality of control switches and control levers and transmits a wireless signal for controlling each part of a construction machine in accordance with a received key signal and lever signal.

As shown in FIG. 4, the control panel 310 according to the present invention comprises a panel control unit 420, an input unit 422 and a local area wireless communication control unit 424.

The input unit 422 includes a plurality of control switches and control levers. When an operator operates a desired function using a control switch or a control lever, the input unit 422 detects the operator's operation and outputs an operation signal.

The panel control unit 420 converts an analog operation signal generated from the input unit 422 into a digital signal and controls all of the operations of the control panel which combines an operator's operation signal, which is converted into a digital signal, with an inherent network address and transmits the combined signal, wherein the above network address becomes an inherent address of a departure place and a destination place.

The local area wireless communication control unit 424 performs a wireless data communication between the control panel 310 and the main control device 300 or between the control panel 310 and the auxiliary control device 320.

Here, the local area wireless communication unit 424 stores an inherent network address set by the main control device 300 and transmits a wireless signal corresponding to an operator's operation signal, which is converted into a digital signal through the panel control unit 420, to the main control device 300 or the auxiliary control device 320 through the internal wireless network 302 of the construction machine using an inherent network address.

The local area wireless communication control unit 424 may include a transceiver (not shown) and an antenna (not shown) for performing a wireless data communication and is designed to perform a communication using an allocated inherent network address based on a previously set wireless communication protocol.

Here, the wireless data communication method—which comprehensively represents a protocol and application needed for a wireless data communication—may be selected among RFID, Zigbee, TCP/IP, etc.

Most preferably, the wireless data communication is performed using a Zigbee method in consideration with an internal environment of a construction machine, a minimization of power, and communication efficiency.

The Zigbee communication method is a representative technology of the wireless network which has low power consumption, low cost and easy use and is a standardized name of an upper level protocol and application based on the PHY/MAC that was standardized by the IEEE 802.15.4 working division committee in 2003.

The Zigbee device is classified as a FFD (Full Function Device), which is capable of performing a network construction and data routing in its function, and a RFD (Reduced Function Device), which is capable of simply performing a communication function.

The Zigbee protocol supports both a star topology and a peer-to-peer topology.

The star topology represents a network structure in which a communication is performed between a network coordinator and a network device on a network connected with a single channel (Hop). The peer-to-peer topology represents a network structure in which free communication is performed between network devices using a multiple channel (Hop).

Since the communication control unit 402 of the main control device 300 according to the present invention is provided with an internal wireless network 302 of a construction machine and relays wireless data communication between each control panel 310 and each auxiliary control device 320, the main control device 300 should be constituted using the FFD which is capable of performing network construction and data routing.

The local area wireless communication control unit 424, which is provided in the control panel 310 and the auxiliary control device 320 for thereby performing wireless data communication, may be implemented selectively using the FFD or the RFD.

When the internal wireless communication network 302 of the construction machine is constituted using the star topology, the local area wireless communication control unit 424 is formed based on the RFD, and when the internal wireless communication network of the construction machine is constituted using the peer-to-peer topology, the local area wireless communication control unit 424, which is capable of performing a data routing function, is formed based on the FFD.

Using the star topology, when a certain problem occurs in the main control device with respect to its economy or operation efficiency, the operation of the internal wireless communication network of the construction machine may stop. However, when the peer-to-peer topology is used, the operation safety of the internal wireless communication network of the construction machine is enhanced. On the other hand, economic efficiency decreases.

In the following embodiment of the present invention, the main control device 300, which receives a wireless signal from the control panel 310, transmits a certain wireless control signal to the auxiliary control device 320, and the auxiliary control device 320 controls the controlled control device 322 and performs a certain function corresponding to operator's control. The above embodiment of the present invention is implemented based on the wireless network, which is formed of the star topology. Based on the construction of the present invention, the main control device 300 may directly control the controlled control device 322. The auxiliary control device 320 may also directly receive a wireless signal from the control panel 310 for thereby controlling the controlled control device 322. Namely, it is obvious to a person skilled in the art that the present invention may be implemented in various embodiments.

The main control device 300 allocates an inherent network address to each control panel 310, with the inherent network address being used by the internal wireless data communication of the construction machine and receives a wireless signal from the control panel 310 and transmits a wireless control signal for controlling a corresponding controlled control device 322 for performing a corresponding function.

As shown in FIG. 4, the main control device 300 according to the present invention comprises a main control unit 400, a communication control unit 402, a storing unit 406, a ROM 412 and a RAM 414.

The ROM 412 stores an operating system program and initialization data for driving the main control device, and the RAM 414 is used for temporarily storing the data.

The ROM 412 may be designed to frequently update the operating system program using an EEPROM (Electrically Erasable Programmable Read-Only Memory), and the update may be performed either online or offline.

The communication control unit 402 may be formed of an internal wireless network 302 of a construction machine by providing the auxiliary control device 320 and the control panel 310 with an inherent network address in accordance with a certain wireless data communication method. The communication control unit 402 performs a wireless data communication with the auxiliary control device 320 and the control panel 310.

As described above, when the wireless data communication is designed to perform using Zigbee, the communication control unit 402 should be constructed using the FFD so that the communication control unit 402 provides each control panel 310 and auxiliary control device 320 with its respective inherent network address, constructs the internal wireless network 302, and performs a data routing function in which data is received from each respective local area wireless communication control unit 424 or 432 and is retransmitted.

For wireless data communication, the communication control unit 402 may include a control unit (not shown), a transceiver (not shown) and an antenna (not shown). The control unit, the transceiver and the antenna may be integrated into one chip.

The communication control unit 402 according to the present invention includes a local area wireless communication control unit 408 for constructing and managing an internal wireless network 302 of a construction machine. The communication control unit 402 may further include a remote wireless communication control unit 410 for performing a wireless data communication by connecting to an external commercial network.

The local area wireless communication control unit 408 constructs and manages an internal wireless network 302 of a construction machine, and the remote wireless communication control unit 410 transmits information concerning the construction machine to a construction machine maintenance server or a mobile communication device through an external commercial network.

Here, the remote wireless communication may be performed based on a wireless LAN method using an AP (Access Point), and a method of using a satellite. The system according to the present invention is preferably constructed so that a commercial network is connected using satellite communication because commercial communication may not be available at the work site of a construction machine.

The remote wireless communication control unit 410 receives state information of the controlled control device 322 of a construction machine, with the information being transmitted from each auxiliary control device 320 and externally transmits state information of a construction machine based on a certain set state or when an emergency situation occurs.

The main control unit 400 controls all of the operations of a construction machine based on an operating system stored in the ROM 412.

When power is supplied to the construction machine, the main control unit 400 loads the operating system program stored in the ROM 412 and controls each part of the construction machine in accordance with corresponding operating system.

When a wireless signal is received from the control panel 310 through the communication control unit 402 in accordance with an operator's control, the main control unit 400 analyzes the wireless signal and outputs a wireless control signal for controlling the auxiliary control device 320 so that the correct function is performed based on an operator's control with reference to the source (control panel or specific input unit of control panel) network address or the destination (auxiliary control device or controlled control device controlled by auxiliary control device) network address which are both contained in the wireless signal. The communication control unit 402 transmits a wireless control signal to the corresponding auxiliary control device 320 with reference to the destination network address of the wireless control signal.

The storing unit 406 stores an automatic control program and various data of construction machines and a construction machine maintenance database, and the data are stored or deleted in accordance with control the main control unit 400.

The main control unit 400 automatically controls the controlled control device 322 of a construction machine using the automatic control programs of various construction machines, which are stored in the storing unit. The automatic control programs are transmitted to the auxiliary control device 320 through the internal wireless network 302 of the construction machine, with the auxiliary control device 320 being provided for controlling a corresponding controlled control device 322.

In this case, with the operator's control, it is possible to change or delete the automatic control program and set an environment.

The state information of the construction machine transferred from various auxiliary control devices 320 is stored in the storing unit 406 in a database form. The state information of the construction machine is then transmitted to the maintenance server through an external commercial wireless network at certain intervals, with the maintenance server being provided for performing a maintenance of the construction machine.

The storing unit 406 may store construction machine maintenance databases. Here, the construction machine maintenance database is provided for diagnosing the states of the construction machine in accordance with state information of the controlled control device 322 of the construction machine.

The main control device 300 according to the present invention may include a self-diagnosis unit 404. The self-diagnosis unit 404 receives state information of the controlled control device 322 transferred from each auxiliary device 320 in accordance with the control of the main control unit 400 and compares with the value of the construction machine maintenance database stored in the storing unit 406 for thereby diagnosing an operation state of each controlled control device 322, and outputs a certain error message when failure occurs in the system based on a result of the diagnosis of the state of each controlled control device 322.

Namely, the self-diagnosis unit 404 receives state information of the controlled control device 322 from each auxiliary control device 320 and stores the information into the storing unit 406 in a database form. For example, the self-diagnosis unit 404 transmits the state information of the construction machine to the maintenance server through an external commercial wireless network based on a certain set environment, for example, on a one day interval or one week interval, with the maintenance server being provided for performing management functions such as maintenance or repair of the construction machine, and with the state information of the construction machine corresponding to the equipment operation time, a time when temperature is maintained above a set temperature of an operation oil, information and number of error occurrences, and an operation time by the operation mode.

In addition, the self-diagnosis unit 404 compares state information transmitted from each auxiliary device 320 with a construction machine maintenance database value stored in the storing unit 406 for thereby diagnosing the state of the construction machine. When a certain error occurs in the construction machine as a result of the diagnosis, a maintenance request message containing the state information is transferred to the maintenance server through an external wireless network.

When a certain error occurs in the construction machine, the self-diagnosis unit 404 displays an error state of the construction machine and an emergency measurement and maintenance method on the screen.

The auxiliary control device 320 receives and analyzes a wireless control signal from the main control device 300 for thereby performing input and output control, operation control, error detection and automatic control of the controlled control device 322.

The auxiliary control device 320 is connected with a plurality of the controlled control devices 322 and a plurality of sensors 324 for collecting the state information of a plurality of the controlled control devices 322.

The controlled control device 322 may be a driving device such as an engine, a pump, a valve, etc., an auxiliary device such as an air conditioner, a radio, a cooling and heating device, etc, and a work device such as a boom, an arm, a bucket, etc. The sensor 324 may be one of various sensors for measuring an operation state of a construction machine such as various temperature sensors, a RPM sensor, an engine state measurement sensor, a pump oil level measurement sensor, a hydraulic measurement sensor, an operation oil temperature sensor, or a cooling oil temperature sensor.

The auxiliary control device 320 may also be installed based on a 1:1 match with respect to each controlled control device 322. A proper number of the auxiliary control devices 320 may be provided based on their functions and positions, while corresponding with the controlled control devices 322.

The driving control device for controlling the operations of various hydraulic devices of a construction machine, a cooling control device for controlling the cooling operations of various hydraulic devices, an engine control device of an engine, a cooling and heating control device for controlling a cooling or heating operation of an operation cab and an automatic work control device for controlling automatic work of a construction machine may be constructed using a corresponding auxiliary control device 320. The above devices may be grouped based on their functions and positions for more control.

As shown in FIG. 4, the auxiliary control device 320 according to the present invention comprises an auxiliary control unit 430, a local area wireless communication control unit 432, a driving control unit 434 and a sensor control unit 436.

The local area wireless communication control unit 432 stores an inherent network address set by the main control device 300 and performs wireless data communication with the main control device 300 or the control panel 310 in accordance with a certain protocol through an internal wireless network of the construction machine using an inherent network address.

Since the local area wireless communication control unit 432 of the auxiliary control device 320 is constructed in the same structure as the local area wireless communication control unit 424 of the control panel 310, the description of the same will be omitted.

The sensor control unit 436 collects and analyzes the state information of the controlled control device 322 received from the sensors 324 which measure the states of the controlled control device 322 and outputs the operation state of the controlled control device 322 to the auxiliary control unit 430.

The auxiliary control unit 430 receives a wireless control signal from the main control device 300 through the local area wireless communication unit 432 and controls the driving control unit 434 for thereby performing a function corresponding to a wireless control signal and automatically controls the operation state of the controlled control device 322 by receiving state information of the controlled control device 322 and transmits state information of the controlled control device 322 to the main control device 300 through the local area wireless communication control unit 432.

The wireless electronic system of a construction machine according to the present invention further comprises a MDU (Machine Display Unit) 312 for displaying various information of a construction machine to an operator.

The MDU 312 is installed at a peripheral portion of an operation cab of a construction machine and communicates with the control panel 310, the main control unit 300 and the auxiliary control device 320 through an internal wireless network 302 of a construction machine and displays various information of a construction machine in accordance with the control of the main control device 300.

As shown in FIG. 4, the MDU 312 according to the present invention is preferably provided with a MDU control unit 440, a display unit 442, an input unit 448, and a local area wireless communication control unit 450.

The input unit 448 includes a plurality of switches or is constructed with a touch screen and transmits a wireless signal corresponding to an operator's control to the main control device 300.

The local area wireless communication control unit 450 stores an inherent network address set by the main control device 300 and communicates with the main control device 300 or the control panel 310 and the auxiliary control device 320 in accordance with a certain protocol through the internal wireless network 302 of a construction machine using an inherent network address.

Since the local area wireless communication control unit 450 and the input unit 448 of the MDU 312 are constructed in the same way that the local area wireless communication control unit 424 and the input unit 422 of the control panel 310, the description of the same will be omitted.

The MDU control unit 440 receives construction machine related information, such as an engine revolution, work mode, output voltage, and error number from the main control device 300 through the local area wireless communication control unit 450, and the display unit 442 displays construction machine related information in accordance with the control of the MDU control unit 440.

The display unit 442 according to the present invention may include an LCD unit 444 and a lamp unit 446 formed of a plurality of lamps.

Here, the LCD unit 444 displays a 3D image, a graphic file and a document file from the main control device 300, in detail, such as an engine cooling water temperature, a hydraulic operation oil level, an engine RPM and work mode, a current time, an air conditioner mode information, an electrical function operation, a rear view camera input information, an equipment history document information, an output load characteristic curve, etc. The lamp unit 446 includes an alarm lamp and indicates an operation state of a construction machine, so that the operator can see the operation state.

The wireless electronic system according to the present invention may further comprise a key pad which performs wireless data communication with a control panel, a main control device and an auxiliary control device through an internal wireless network of a construction machine and outputs a control signal for controlling the main control device, the MDU which displays information, the graphic display unit, and the cooling and heating control device.

The keypad is installed in an operation cab so that an operator can easily operate for thereby controlling various functions of a construction machine that are frequently used by the operator.

Various control buttons of the key pad may be set when the construction machine is manufactured, but the various control buttons of the same may also be designed so that the operator can set a certain setting key.

The operations of the wireless electronic system of a construction machine according to a preferred embodiment of the present invention will be described.

When an operator operates the input unit 422 of the control panel 310 for operating a construction machine, the input unit 422 detects operation by the operator and outputs a signal to the panel control unit 420, and the panel control unit 420 converts the analog operation signal into a digital signal.

The panel control unit 420 generates a wireless signal by combining the digital operation signal, the network address of the control panel and the network address of the auxiliary control device 320, which controls the controlled control device 322 in accordance to the operation signal and transmits the generated wireless signal to the main control device 300 through the local area wireless communication control unit 424.

The wireless signal transmitted from the panel control unit 420 through the internal wireless network 302 of the construction machine is received by the main control unit 400 through the communication control unit 402 of the main control device 300, and the main control unit 400 interprets the wireless signal and transmits a wireless control signal to the corresponding destination auxiliary control device 320 using the communication control unit 402.

Here, the wireless control signal may be a wireless signal that the main control device 300 receives. With the wireless control unit 400, a new wireless control signal may be generated by adding certain information, for example, a control command based on a previously set automatic work program.

The auxiliary control device 320 receives a wireless control signal from the main control device 300 and controls the controlled control device 322 in accordance with the wireless control signal.

The auxiliary control device 320 receives state information of the controlled control device 322 from the sensor 324 for measuring an operation state of the controlled control device 322 and analyzes the state information, so that the controlled control device 322 is flexibly controlled based on the work environment and other operation set values.

The wireless electronic system of a construction machine according to the present invention transmits state information of the controlled control device 322 to the main control device 300, and the main control device 300 updates the state information of the controlled control device 322 in the form of a database record and stores the information into the storing unit 406 of the main control device 300.

The state information of the controlled control device 322, which is stored in the form of a database, may be used as a reference material when the construction machine is maintained. The state information of the same may be transmitted through the communication control unit 402 of the main control unit 300 based on a certain set environment for thereby being used as a state diagnosis and maintenance information of the construction machine.

While the auxiliary control device 320 is performing a certain function by controlling the controlled control device 322, when it detects that the controlled control device 322 is not operating normally as a result of the analysis of the state information of the controlled control device 322 from the sensor 324, the auxiliary control device 320 transmits the state information of the controlled control device 322 to the main control device 300.

When the main control device 300 receives an abnormal state information—state information when the controlled control device 322 does not operate normally—of the controlled control device 322 from the auxiliary control device 320, it diagnoses the state of the controlled control device 322 with reference to the maintenance database of the construction machine stored in the storing unit 406 and generates a necessary wireless control signal and transmits to the auxiliary control device 320.

When it is determined that there is a critical error in the state of the controlled control device 322, the main control device 300 transmits the related information to the MDU 312 to display the information and simultaneously transmits the related information to the outside, using the wireless communication control unit 410, through an external commercial wireless network.

The information concerning the type of the abnormal state and the emergency measurement with respect to the controlled control device 322 that is in an abnormal state is displayed to the operator through the MDU 312.

Figure 5:
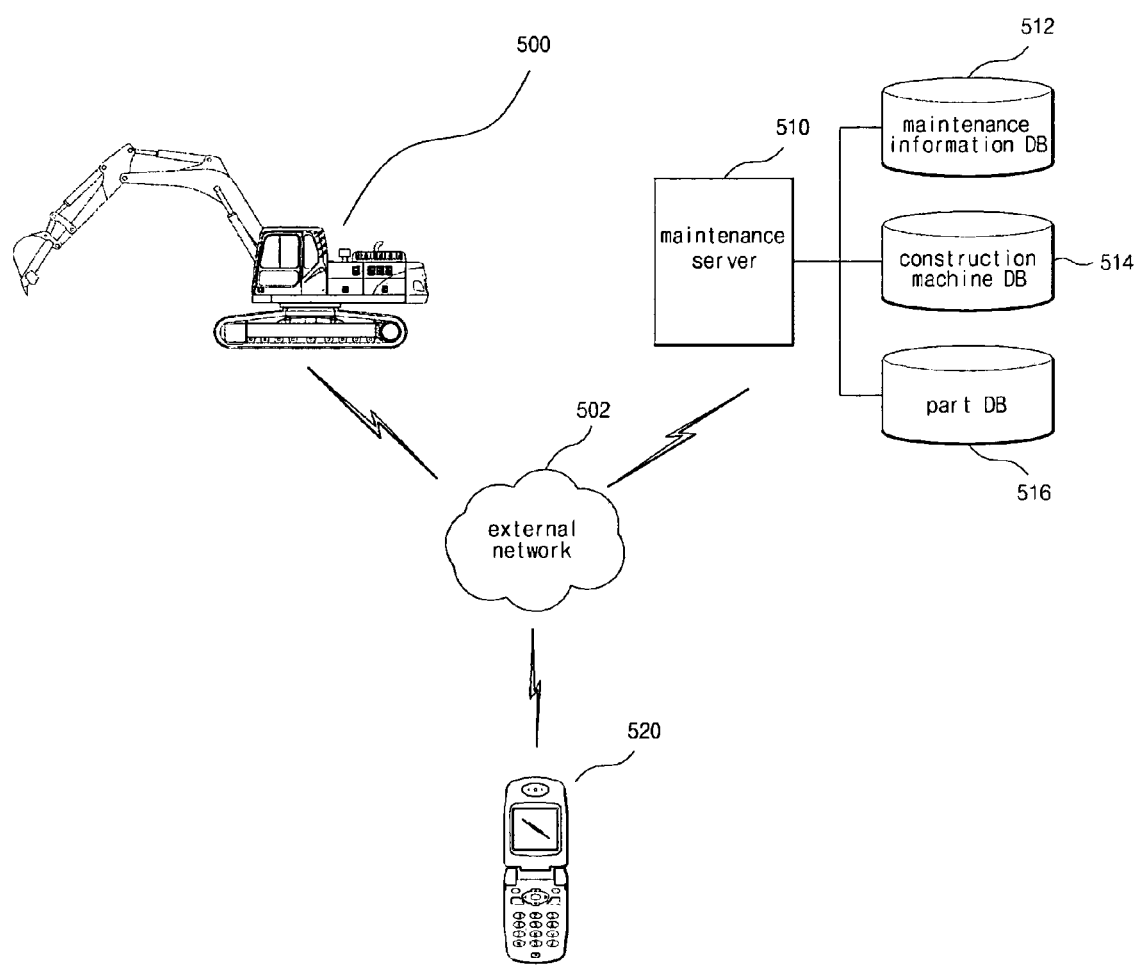
FIG. 5 is a view illustrating a construction of a maintenance system of a construction machine using a wireless electronic system of a construction machine according to another embodiment of the present invention.

FIG. 5 is a view illustrating a construction of the maintenance system of a construction machine using a wireless electronic system of a construction machine according to another embodiment of the present invention.

Another embodiment of the present invention will be described with reference to the accompanying drawings.

As shown therein, the construction machine maintenance system using a wireless electronic system of a construction machine according to the present invention comprises a construction machine 500 having a wireless electronic system, and a construction machine maintenance server 510 connected with the construction machine 500 through the commercial wireless network 502.

The construction machine 500 having a wireless electronic system comprises a wireless electronic system which is designed to perform wireless data communication between each electronic parts or electronic modules.

The wireless electronic system of the construction machine monitors the state of the controlled control device 322 using state information of various controlled control devices 322. When a certain error occurs in a controlled control device 322, the state information of the controlled control device 322 that has an error is transmitted through the external commercial wireless network 502.

So as to perform a wireless data communication with an external unit, the construction machine 500 is provided with wireless data communication equipment such as a wireless LAN system and a satellite communication system.

The construction machine maintenance server 510 receives construction machine state information from the construction machine 500 and analyzes the state information for thereby diagnosing the state of the construction machine 500. The construction machine database 514 contains various state information of the construction machine that is stored by receiving and using the state information with a certain inherent identifier for each construction machine is provided to each database.

The construction machine maintenance server 510 may comprise a construction machine information database 514, a construction machine maintenance information database 512 and a construction machine part database 516.

The information of the construction machine 500 is structurally stored into the construction machine information database 514, and an inherent identifier for each construction machine 500 is provided to the database. The stored state information of the construction machine transferred from the construction machine 500 is organized by a certain set method such as a sequential method or the kind of parts of each construction machine 500 in accordance with an inherent identifier and are used for the maintenance of the construction machine 500.

The construction machine maintenance information database 512 stores various information related to construction machine maintenance such as failed parts and emergency measurements based on the state information of the construction machine, and the construction machine part database 516 stores inventory status for various parts along with incoming and outgoing dates of the parts.

The construction machine maintenance information database 512 and the construction machine part database 516 are updated in real time or periodically.

As a result of the analysis of the state information of the construction machine performed by the construction machine maintenance server 510, when an error in the construction machine 500 is detected, the construction machine maintenance server 510 extracts an accurate error reason and emergency measurement method with reference to the connected construction machine maintenance information database 512 and transmits to the construction machine 500. The construction machine 500, which receives the accurate error reason and the emergency measurement method, displays the information such as an emergency measurement method on the display device such as the MDU 312 installed in the construction machine 500.

When the construction machine maintenance system according to the present invention detects an error by judging the state information of the controlled control device 322 from the sensor 324, which measures the state of the controlled control device 322 of the construction machine, a maintenance request, which requests the state information and maintenance of the controlled control device 322, is transmitted through the commercial wireless network 502. The construction machine maintenance server 510 receives the above state information and maintenance request and determines the maintenance dates of the construction machine 500 with reference to the construction machine part database 516 and transmits the maintenance date information of a corresponding construction machine to the construction machine 500.

Here, the construction machine maintenance system using a wireless electronic system according to the present invention may further comprise a mobile communication terminal 520 which receives construction machine state information from the construction machine through the commercial wireless network 502 and displays the same.

The construction machine 500 transmits to a destination address of the state information of the construction machine through the wireless network together with an address of the message server such as a SMS (Small Message Server) and a MMS (Multimedia Message Server) of a mobile communication service provider. The message server of the mobile communication service provided receives the information and transmits the state information of the construction machine to the proper mobile communication terminal in the form of SMS or MMS.

The mobile communication terminal 520 receives the state information of the construction machine and displays the same on the display unit, thereby providing the user with the state information of the construction machine in real time.

When the present invention is implemented, the state information of the construction machine may be set and transmitted to the mobile communication terminal 520 at a certain time period or under certain circumstances (for example, when an error occurs at the construction machine).

As described above, in the wireless electronic system of a construction machine and a maintenance system of a construction machine using the same according to the present invention, the information between various electronic parts or electronic modules in the construction machine are transmitted and received based on a wireless method, so that convenience and efficiency of the work are enhanced; and it is possible to minimize short circuit problems which may occur with electronic wires.

According to the present invention, an accurate error diagnosis is possible by transmitting state information of a corresponding construction machine to the construction machine maintenance server through a commercial wireless network.

In addition, when a certain error occurs at the construction machine, it is possible to check the error through a mobile communication terminal in real time, so that a fast emergency measurement is possible in the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An electronic system of a construction machine provided with a plurality of controlled control devices, a plurality of sensors for sensing a state of each controlled control device, and a wireless electronic system of a construction machine, comprising:

at least one control panel which transmits a wireless signal for controlling each part of a construction machine in accordance with an operator's control through an input unit including a plurality of control switches and control levers and which is equipped in a driver's cab of construction machine;

a main control device which receives a wireless signal from the control panel and transmits a wireless control signal for controlling a corresponding device and which is equipped in the construction machine;

at least one auxiliary control device which performs input and output control, operation control, error detection, or automatic control of each part of construction machine in accordance with the wireless control signal from the main control device and which is equipped in the construction machine; and an internal wireless network which is constructed by the main control device for wireless data communication between the control panel, the main control device, and the auxiliary control device.

2. The system of claim 1, wherein said main control device includes:

a ROM (Read Only Memory) which stores an operating system program and initialization data for driving a main control device;

a RAM (Random Access Memory) for temporarily storing data;

a communication control unit which forms a wireless network by providing an inherent network address to each auxiliary control device and the control panel and performs wireless data communication with the auxiliary control device and the control panel based on a certain wireless data communication protocol;

a main control unit which controls the entire operation of a construction machine in accordance with an operating system stored in the ROM and receives a wireless signal transmitted from the control panel through the communication control unit and transmits a wireless control signal corresponding to the wireless signal; and storing means which stores an automatic control program, various data and construction machine maintenance database of the construction machine, with the stored data being stored or deleted in accordance with the control of the main control unit.

3. The system of claim 1, wherein said control panel includes:

a panel control unit for controlling all operations of the control panel;

the input unit for generating a control signal in accordance with an operator's control; and a local area wireless communication control unit which stores an inherent network address set by the main control device and transmits a wireless signal corresponding to a control signal transmitted from the input unit through an internal wireless network of the construction machine using the network address based on a certain protocol.

4. The system of claim 1, wherein said auxiliary control device includes:

an auxiliary control unit which controls the operation of the auxiliary control device;

a local area wireless communication control unit which stores an inherent network address set by the main control device and performs wireless data communication with the main control device or the control panel through an internal wireless network of a construction machine using the network address based on a certain protocol;

a driving control unit which receives a wireless control signal transmitted from the main control device or the control panel through the local area wireless communication control unit and controls the controlled control device for thereby performing a function corresponding to the wireless control signal; and a sensor control unit which receives and analyzes state information of the controlled control device from the sensors provided at the controlled control device for measuring a state of the controlled control device and transmits the state information through the internal wireless network using the local area wireless communication control unit.

5. The system of claim 2, wherein said communication control unit comprises a local area wireless communication control unit and a remote wireless communication control unit, wherein said local area wireless communication control unit provides an inherent network address to the control panel and the auxiliary control device, respectively, with the network address being used in the internal wireless network, stores the information of the inherent network address, receives data or a wireless signal through the internal wireless network and transmits a wireless control signal or a data to the control panel or the auxiliary control device in accordance with the network address contained in the data or the wireless signal, and wherein said remote wireless communication control unit which is connected with a construction machine maintenance server through an external commercial wireless network and performs wireless data communication.

6. The system of claim 2, wherein said main control device further includes a diagnosing means which receives state information of the controlled control device from the auxiliary control device in accordance with the control of the main control unit, compares the state information with a value in a construction machine maintenance database stored in the storing means, diagnoses an operation state of each controlled control device and outputs an error message when failure occurs in the system based on a result of the diagnosis of the state of each controlled control device.

7. The system of claim 1, wherein said wireless electronic system of the construction machine further includes an MDU (Machine Display Unit) which performs wireless data communication with the control panel, the main control device and the auxiliary control device through an internal wireless network of the construction machine and displays an information regarding the construction machine in accordance with the control of the main control device.

8. The system of claim 7, wherein said MDU includes:
MDU control unit which controls the operation of the MDU;
an input unit which generates a control signal in accordance with an operator's control;
a local area wireless communication control unit which stores an inherent network address set by the main control device and performs wireless data communication with the main control device or the control panel through an internal wireless network of the construction machine using the network address in accordance with a certain protocol; and
a display unit which displays construction machine information transmitted from the main control device or the auxiliary control device through the local area wireless communication control unit.

9. The system of claim 8, wherein said display unit includes:
an LCD unit which displays a graphic image, a 3D image and a document file; and
at least one lamp unit which indicates the state of a construction machine.

10. The system of claim 1, wherein said auxiliary control device includes at least one of a driving control unit for controlling the operations of various hydraulic devices of the construction machine, a cooling control device for controlling the cooling operations of various hydraulic devices, an engine control device, a cooling and heating control device for controlling the cooling and heating operation of an operation cab, and an automatic work control device for controlling automatic work of the construction machine.

11. The system of claim 1, wherein said control panel, main control device and auxiliary control device perform wireless data communication using the Zigbee method.

12. In a construction machine maintenance system in which a construction machine maintenance server is connected with a construction machine through a commercial wireless network, with the construction machine maintenance server being provided with a construction machine information database, a construction machine maintenance information database, and a construction machine part database, said maintenance system using a wireless electronic system of a construction machine, comprising:
a construction machine which includes a wireless electronic system of the construction machine of claim 1; and
a construction machine maintenance server which receives a construction machine state information transmitted from the construction machine through the commercial wireless network, constructs a construction machine information database using the state information of the construction machine and transmits maintenance information data a construction machine for maintaining the construction machine when a construction machine has an error as a result of the analysis that is performed with respect the construction machine with reference to the construction machine maintenance information database.

13. The system of claim 12, wherein said construction machine transmits state information and a maintenance request of the controlled control device when a certain error occurs at the controlled control device; and said construction machine maintenance server receives the state information and the maintenance request, determines a maintenance date of the construction machine with reference to the construction machine part database and transmits the maintenance date information of the construction machine to the construction machine.

14. The system of claim 12, wherein said maintenance system using a wireless electronic system of the construction machine further includes a mobile communication device which receives state information of the construction machine transmitted through the commercial wireless network based on a wireless method and displays the state information.

15. The system of claim 1, wherein said wireless electronic system of the construction machine further includes a key pad which performs a wireless data communication with the control panel, the main control device and the auxiliary control device through an internal wireless network of the construction machine and outputs a control signal for controlling an MDU which displays the information of the construction machine, a graphic image display unit, and a cooling and heating control device.

* * * * *